United States Patent [19]

Tamura et al.

[11] Patent Number: 4,998,173

[45] Date of Patent: Mar. 5, 1991

[54] FACSIMILE MACHINE FOR CONTINUOUS TRANSMITTING A PLURALITY OF ORIGINALS

[75] Inventors: Nobuhiro Tamura, Yamatokoriyama; Matahira Kotani, Nara; Hiroshi Morimoto, Sakurai; Masayuki Hachinoda, Nara, all of Japan

[73] Assignee: Sharp Kabushiki Kaisha, Osaka, Japan

[21] Appl. No.: 352,660

[22] Filed: May 11, 1989

Related U.S. Application Data

[63] Continuation of Ser. No. 128,861, Dec. 4, 1987, abandoned.

[30] Foreign Application Priority Data

Dec. 5, 1986 [JP] Japan .................................. 61-291246

[51] Int. Cl.$^5$ .............................................. H04H 1/00
[52] U.S. Cl. .................................... 358/407; 358/400
[58] Field of Search ............... 358/256, 400, 401, 403, 358/405, 407, 474, 486, 496

[56] References Cited

U.S. PATENT DOCUMENTS

| | | | |
|---|---|---|---|
| 3,914,537 | 10/1975 | Perreault | 358/286 |
| 4,196,455 | 4/1980 | Brooke | 358/285 |
| 4,249,216 | 2/1981 | Kanda | 358/257 |
| 4,274,114 | 5/1981 | Kozima | 358/257 |
| 4,277,805 | 7/1981 | Sato | 358/256 |
| 4,300,169 | 11/1981 | Sato | 358/256 |
| 4,538,185 | 8/1985 | Wiggins | 358/285 |
| 4,723,172 | 2/1988 | Matsumoto | 358/256 |

Primary Examiner—Edward L. Coles, Sr.
Assistant Examiner—Jerome Grant, II

[57] ABSTRACT

A facsimile machine for reading image information to be transmitted and recording received image information, including a setting device for setting the facsimile machine to a continuous transmission mode for continuously transmitting a plurality of original documents, a storage for storing, in response to an input from the setting device, a state of the continuous transmission mode being set and a time counting device for counting, when the state is stored in the storage, a time period after transmission of an image of each of the original documents such that a facsimile circuit of the facsimile machine is kept closed until the time period counted by the time counting device reaches a predetermined value.

6 Claims, 7 Drawing Sheets

FACSIMILE MACHINE FOR CONTINUOUS TRANSMITTING A PLURALITY OF ORIGINALS

This application is a continuation of application Ser. No. 07/128,861 filed on Dec. 4, 1987, now abandoned.

BACKGROUND OF THE INVENTION

The present invention relates to a facsimile machine for transmitting image information.

Conventionally, in facsimile machines of original document transport type, it has been so arranged that in the case where image information of a plurality of stacked original documents is transmitted to a receiving side facsimile machine, the original documents are sequentially conveyed to an image scanner, so that the image information is read by the image scanner so as to be transmitted.

Meanwhile, in known facsimile machines of movable light source type in which an image scanner is displaced so as to read image information, in the case where a plurality of original documents are sequentially read by the image scanner, a certain time period is required for exchanging the original documents, especially booklike original documents. Hence, the known facsimile machines of movable light source type have such a drawback that when a facsimile circuit is opened during exchange of the original documents, it becomes necessary to close the facsimile circuit again.

SUMMARY OF THE INVENTION

Accordingly, an essential object of the present invention is to provide a facsimile machine in which a facsimile circuit is opened upon lapse of a predetermined time period after transmission of an image of one original document, with substantial elimination of the disadvantages inherent in conventional facsimile machines of this kind.

In order to accomplish this object of the present invention, a facsimile machine embodying the present invention comprises: a setting means for setting said facsimile machine to a continuous transmission mode for continuously transmitting a plurality of sequentially positioned original documents; a storage means for storing, in response to an input from said setting means, a state in which said facsimile machine is set to the continuous transmission mode; and a time counting means for counting, when the state is stored in said storage means, a time period after transmission of an image of each of the original documents such that a facsimile circuit of said facsimile machine is kept closed until the time period counted by said time counting means reaches a predetermined value.

In the facsimile machine of the present invention, during continuous transmission of a plurality of original documents, a time period is counted by the time counting means after transmission of an image of each of the original documents such that the facsimile circuit is opened when the time counting means has counted a predetermined time period.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

This object and features of the present invention will become apparent from the following description taken in conjunction with the preferred embodiment thereof with reference to the accompanying drawings which are given by way of illustration only, and thus, are not limitative of the present invention, and in which.

Before the description of the present invention proceeds, it is to be noted that like parts are designated by like reference numerals throughout several views of the accompanying drawings.

DETAILED DESCRIPTION OF THE INVENTION

Figure 1:
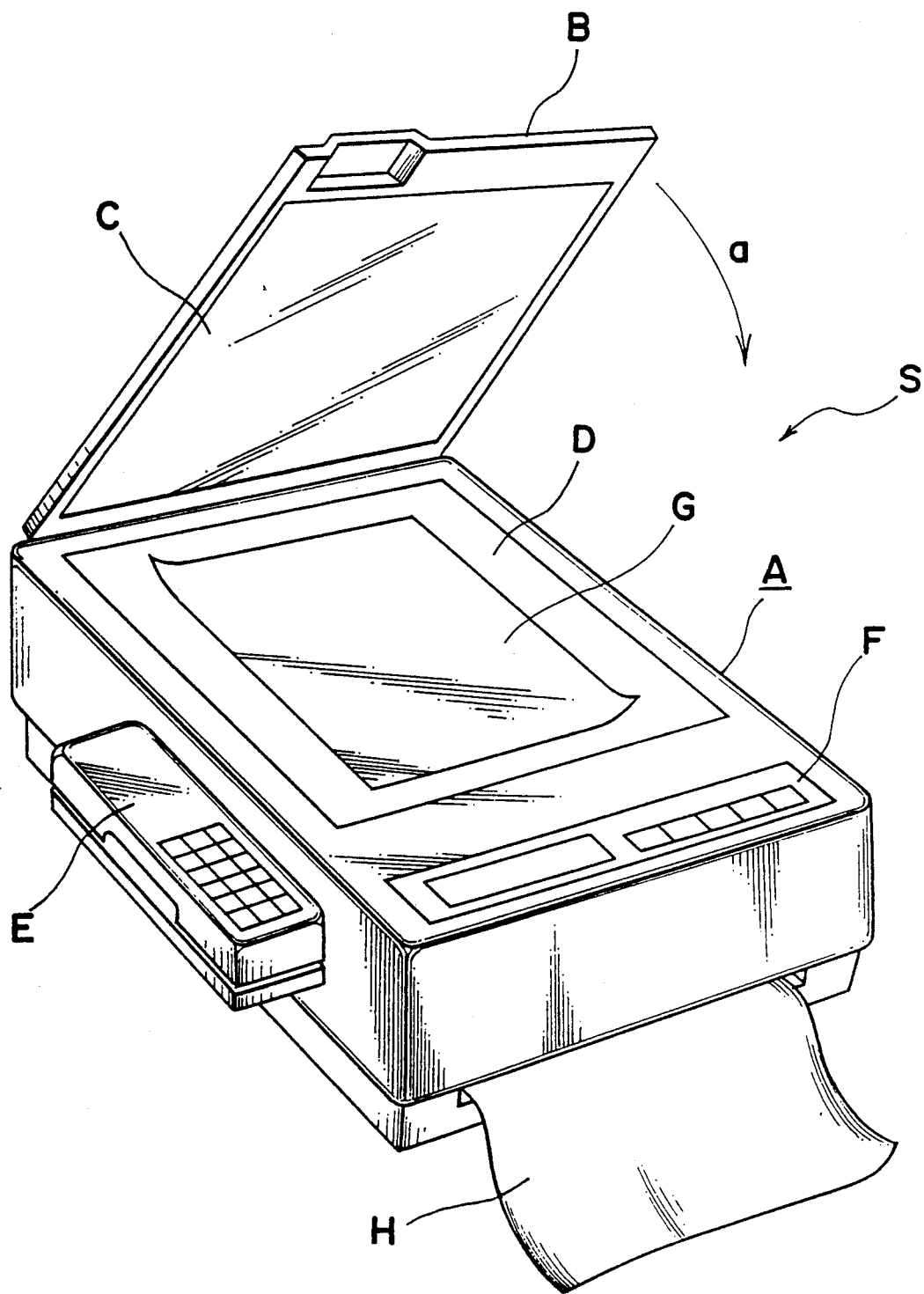
FIG. 1 is a perspective view of a facsimile machine according to one preferred embodiment of the present invention.

Referring now to the drawings, there is shown in FIG. 1, a facsimile machine S according to one preferred embodiment of the present invention. The facsimile machine S includes a machine housing A, an original retainer plate B for retaining, upon its pivotal movement in the direction of the arrow a, an original document G having an image to be read and transmitted, an original holding member C for holding the original document G, an original support plate D for placing the original document G thereon, a recording paper sheet H having a received image recorded thereon, a telephone set E and an operating panel F having various display portions and various input keys. The original holding member C is made of a flexible material and is provided on a lower face of the original retainer plate B so as to be placed on the original document G, while the original support plate D is made of, for example, glass.

Figure 2:
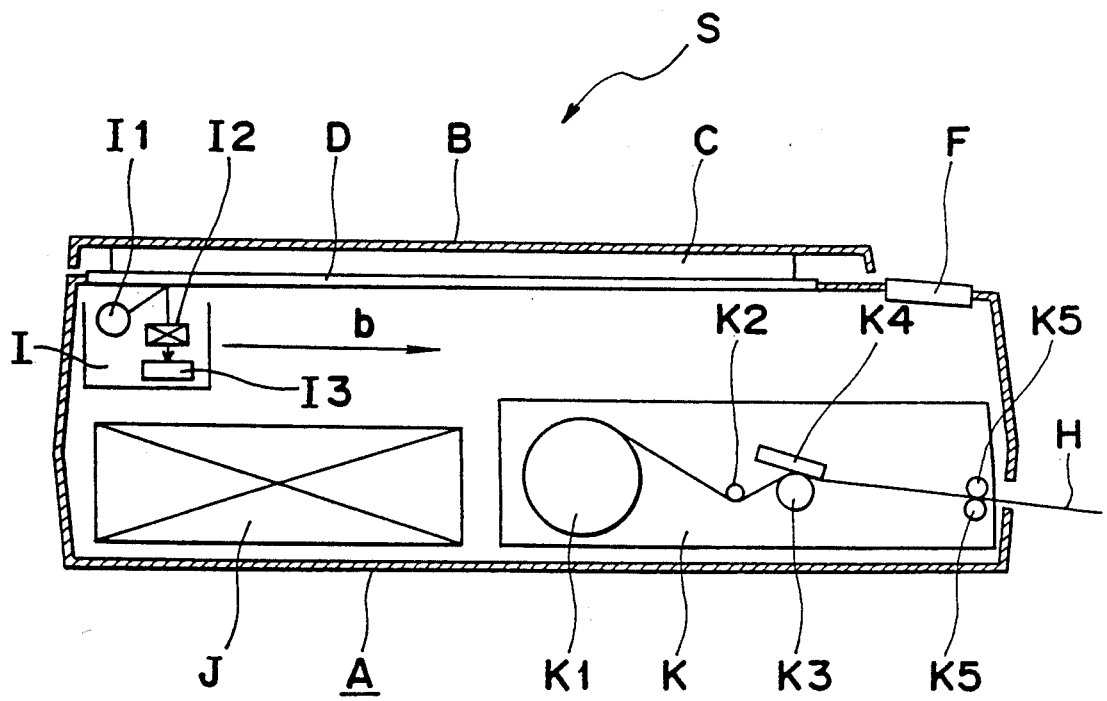
FIG. 2 is a sectional view of the facsimile machine of FIG. 1.

FIG. 2 shows an internal structure of the facsimile machine S. As shown in FIG. 2, the facsimile machine S further includes an image scanner I constituted by, for example, a fluorescent lamp, a facsimile processing portion J and a recording portion K for recording a received image. The image scanner I includes an original lighting device I1 for lighting the original document G, a condenser lens I2 for condensing reflected light from the original document G lit by the original lighting device I1 and a CCD (charge coupled device) image sensor I3. Through sequential displacement of the image scanner I in the direction of the arrow b, the image scanner I reads an image of one original document. The facsimile processing portion J includes various control circuits used for closing of a facsimile circuit, analog-digital conversion, encoding, decoding, etc. in facsimile transmission and reception. The recording portion K includes a recording paper roll K1, a pinch roller K2, a platen roller K3, a recording head K4 constituted by a thermal head, etc. and a pair of discharge rollers K5.

Figure 3:
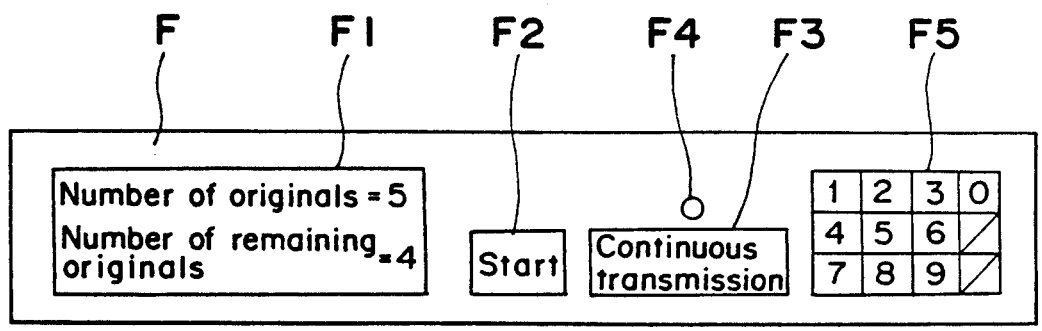
FIG. 3 is a view of an input device employed in the facsimile machine of FIG. 1.

FIG. 3 shows an arrangement of the display portions and the various keys of the input device F. As shown in FIG. 3, the input device F includes a display portion F1 for displaying various data, a start key F2 for commanding start of reading and transmission of an image, a setting key F3 for setting the facsimile machine S to a continuous transmission mode for continuously transmitting a plurality of original documents, an indicating lamp F4, for example, a light emitting diode (LED) adapted to be turned on in the continuous transmission mode and blinked in a waiting state of facsimile transmission in the continuous transmission mode and numerical input keys F5 for inputting numerical data on the number of original documents to be continuously transmitted, etc. The setting key F3 is also used for commanding restarting of reading and transmission of an image.

Figure 4:
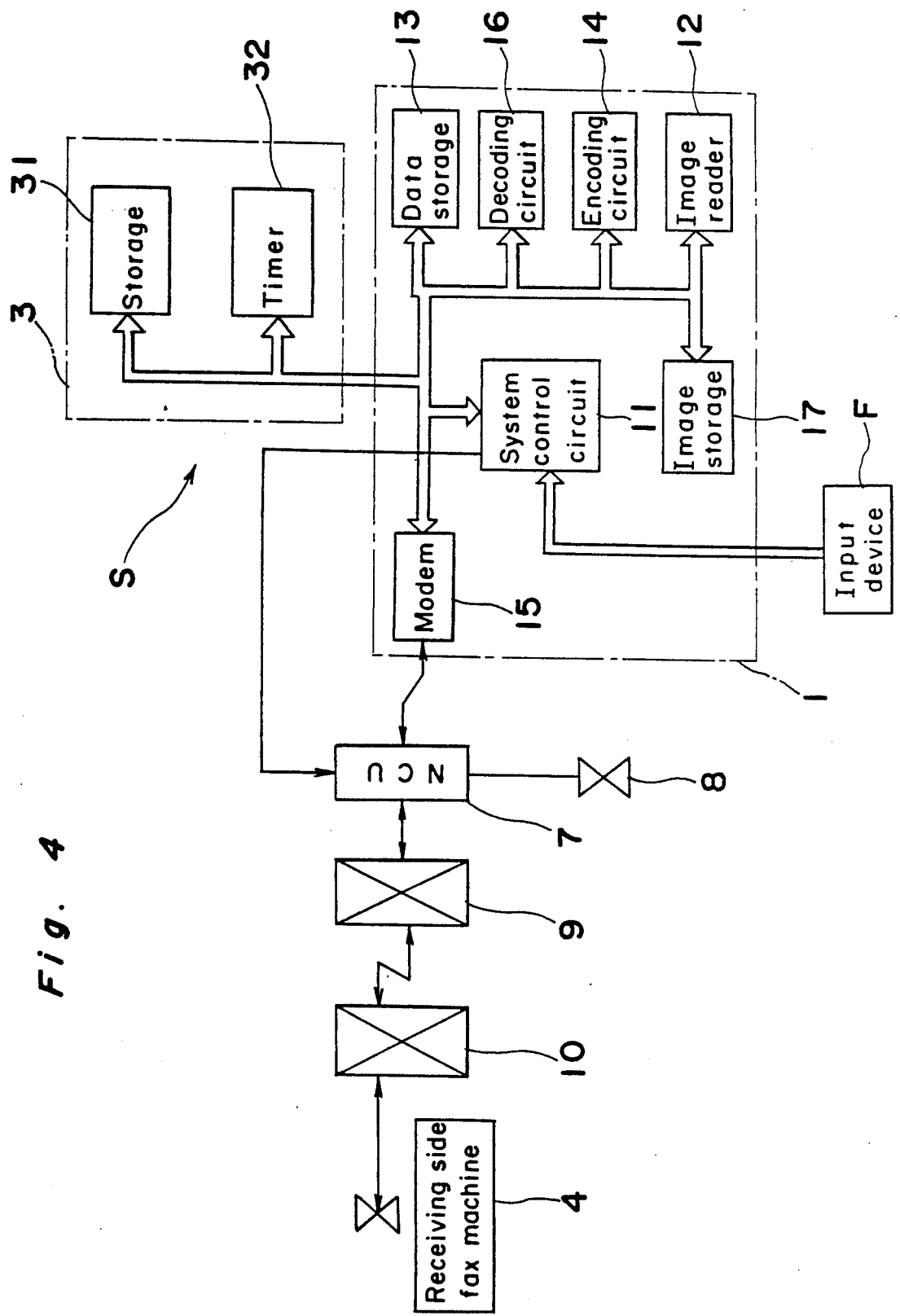
FIG. 4 is a block diagram of the facsimile machine of FIG. 1.

FIG. 4 is a block diagram of the facsimile machine S of the present invention. As shown in FIG. 4, the facsimile machine S includes a main portion 1 of a known construction. The main portion 1 is constituted by a system control circuit 11 for controlling a whole system, an image reader 12 such as the image scanner I, a data storage 13 for temporarily storing read image data, an encoding circuit 14 for encoding the image data of the data storage 13 so as to compress the image data, a modem 15 for converting encoded digital information to be transmitted, into analog information and converting received analog information into digital information, a decoding circuit 16 for decoding received encoded information into image information and an image storage 17 for recording received image data.

The facsimile machine S further includes a continuous transmitter 3 which is characteristic of the present invention. The continuous transmitter 3 includes a storage 31 for storing a state in which the facsimile machine S is set to the continuous transmission mode, namely continuous transmission is reserved and a timer 32 for counting a time period after transmission of an image of one original document in the continuous transmission mode. In addition to the main portion 1 and the continuous transmitter 3, the facsimile machine S includes a network control unit (NCU) 7 and a transmitting side telephone set 8 connected to the facsimile machine S. The facsimile circuit of the facsimile machine S is connected to a receiving side telephone set, i.e. a receiving side facsimile machine 4 through a transmitting side switchboard 9 and a receiving side switchboard 10 such that facsimile transmission and reception are performed.

Figure 5A:
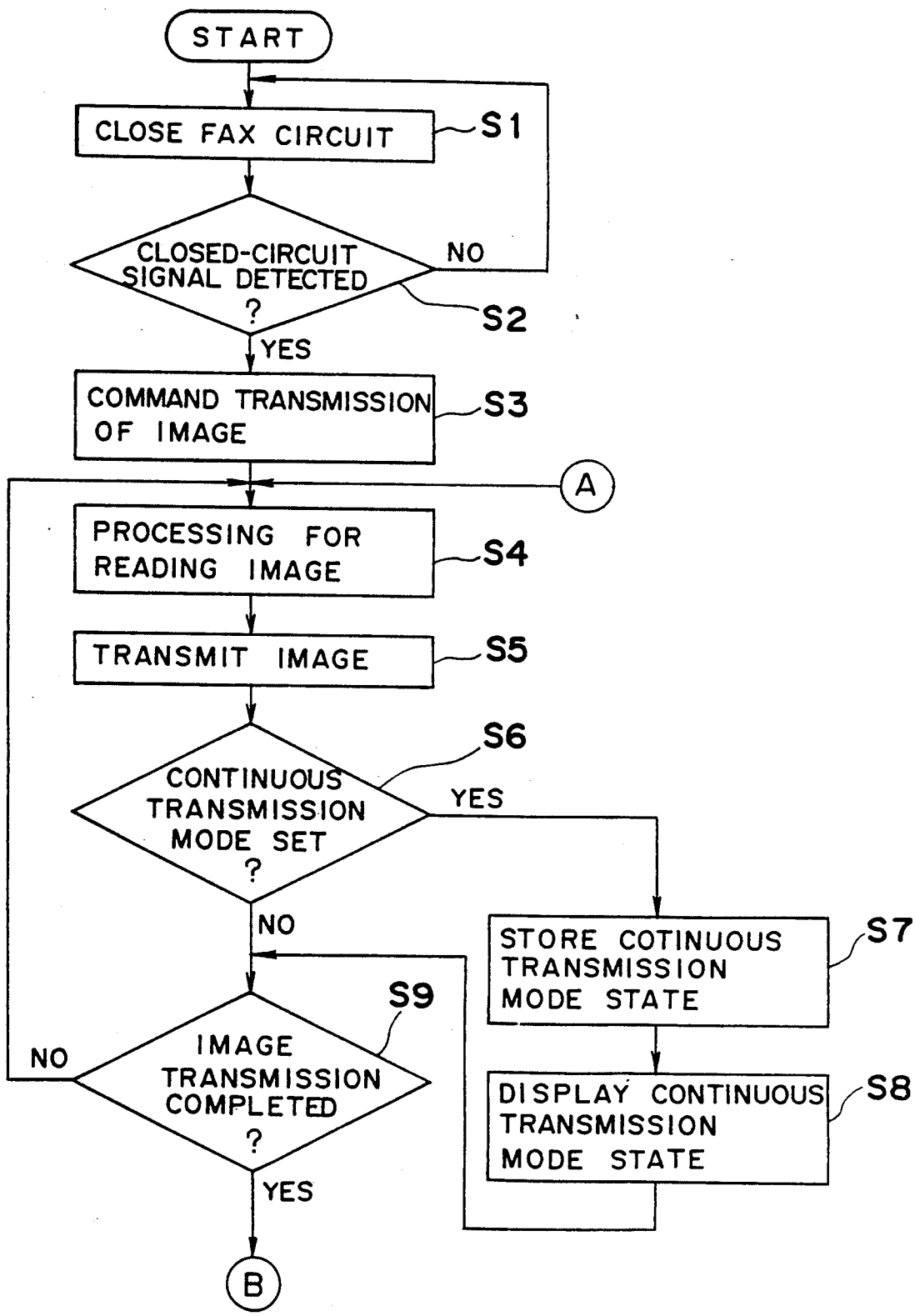
FIGS. 5a and 5b and FIGS. 6a and 6b are flow charts showing processing sequences of operation of the facsimile machine of FIG. 1.
Figure 5B:
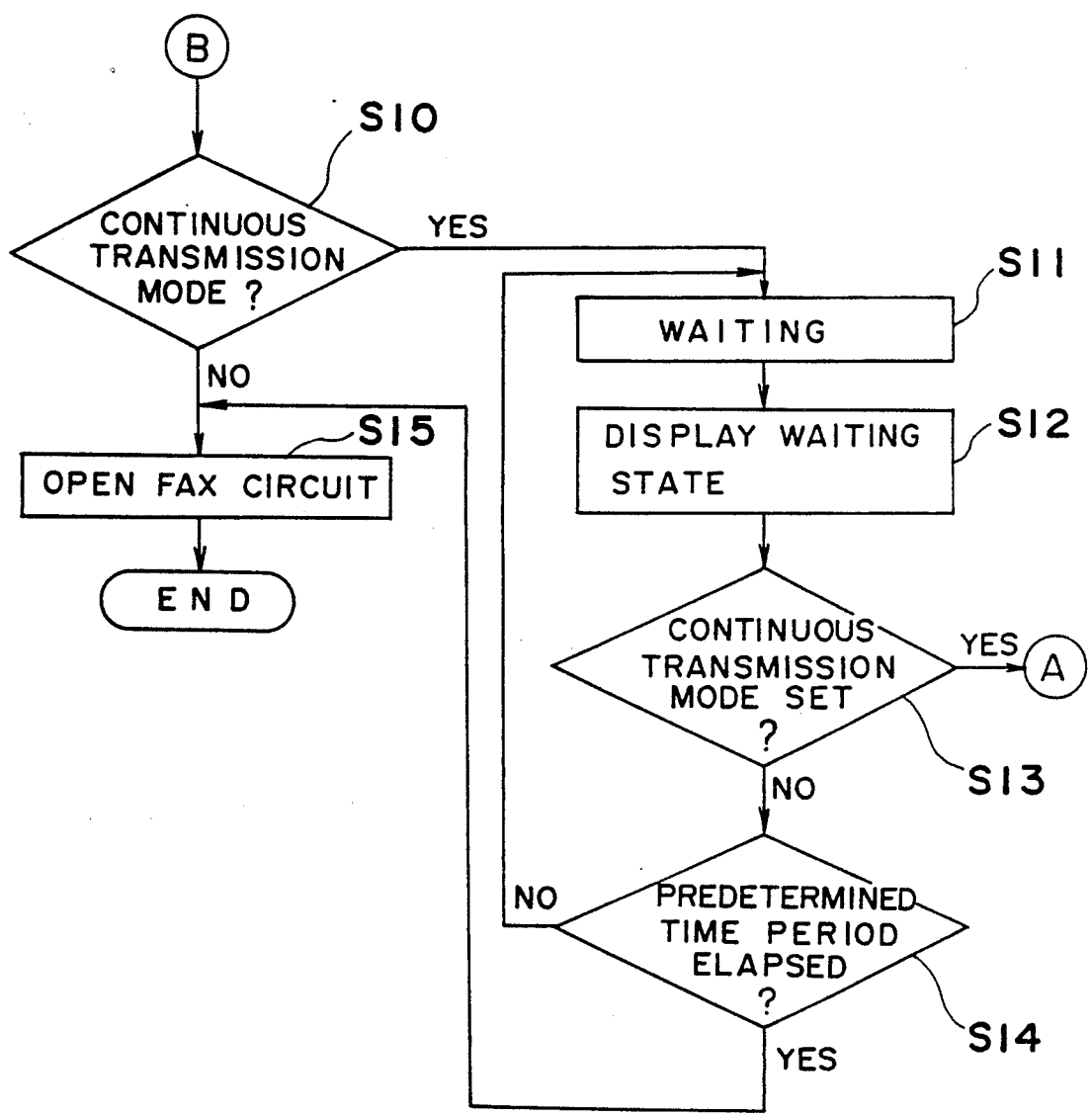

Hereinbelow, one example of a processing sequence of continuous transmission of the facsimile machine S is described with reference to flow charts of FIGS. 5a and 5b. It is to be noted that this processing sequence includes known steps of facsimile transmission. Initially, at step S1, an operator dials the transmitting side telephone set 8 so as to call the telephone set of the receiving side facsimile machine 4 and waits for a closed-circuit signal representing permission of closing of the facsimile circuit, which signal is outputted from the receiving side facsimile machine 4. If the closed-circuit signal is detected at step S2, the start key F2 of the input device F is operated so as to command transmission of an image at step S3. Thus, the system control circuit 11 commands the image reader 12 to start its operation, so that the image reader 12, i.e. the image scanner I is operated so as to read image data sequentially such that the image data are stored in the data storage 13. The image data stored in the data storage 13 are supplied, for example, one line by one line, to the encoding circuit 14 so as to be encoded by the encoding circuit 14 at step S4. Then, at step S5, the compressed image data are sequentially transmitted to the receiving side facsimile machine 4 through the modem 15. A series of this processing is performed for the image of one original document.

Usually, if it is found at step S9 that the image of one original document has been transmitted to the receiving side facsimile machine 4, the facsimile circuit is automatically opened at steps S10 and S15.

Meanwhile, in the case where images of a plurality of original documents are continuously transmitted to the receiving side facsimile machine 4, the operator operates the setting key F3 of the input device F at step S6 during, for example, reading and transmission of the image of the first original document. After this operation at step S6, the storage 31 stores, at step S7, the state in which the facsimile machine S is set to the continuous transmission mode. Subsequently, at step S8, the indicating lamp F4 is turned on at step S8 so as to indicate the state in which the facsimile machine is set to the continuous transmission mode.

If it is found at step S9 that the image of the above described one original document has been transmitted to the receiving side facsimile machine 4 in the state of the continuous transmission mode being set, a decision is made at step S10 as to whether or not the facsimile machine S is set to the continuous transmission mode. In the case of "YES" at step S10, the timer 32 is actuated and the facsimile circuit is set to a waiting state at step S11. At the same time, the indicating lamp F4 is blinked at step S12 so as to indicate the waiting state of facsimile transmission in the continuous transmission mode.

It should be noted here that the timer 32 is constituted by a timer for counting 15 seconds in conformity with CCITT's recommendations regarding a maximum time interval between a point of time of start of one original document and that of the next original document during transmission of images of a plurality of original documents. When the timer 32 starts counting a time period, the system control circuit 11 waits for a command for reading the image of the next original document without opening the facsimile circuit for 15 seconds. Therefore, the operator exchanges the first original document with the second original document during the 15 seconds and operates the setting key F3 of the input device F at step S13. Thus, without opening the facsimile circuit, the system control circuit 11 commands the image reader 12 to read the image of the second original document. At the same time, the system control circuit 11 starts transmission of the second original document and turns off the blinking indicating lamp F4.

Meanwhile, if it is found at step S14 that the setting key F3 for setting the facsimile machine S to the continuous transmission mode is not operated during 15 seconds referred to above, the system control circuit 11 commands the NCU 7 to open the facsimile circuit at step S15.

Figure 6A:
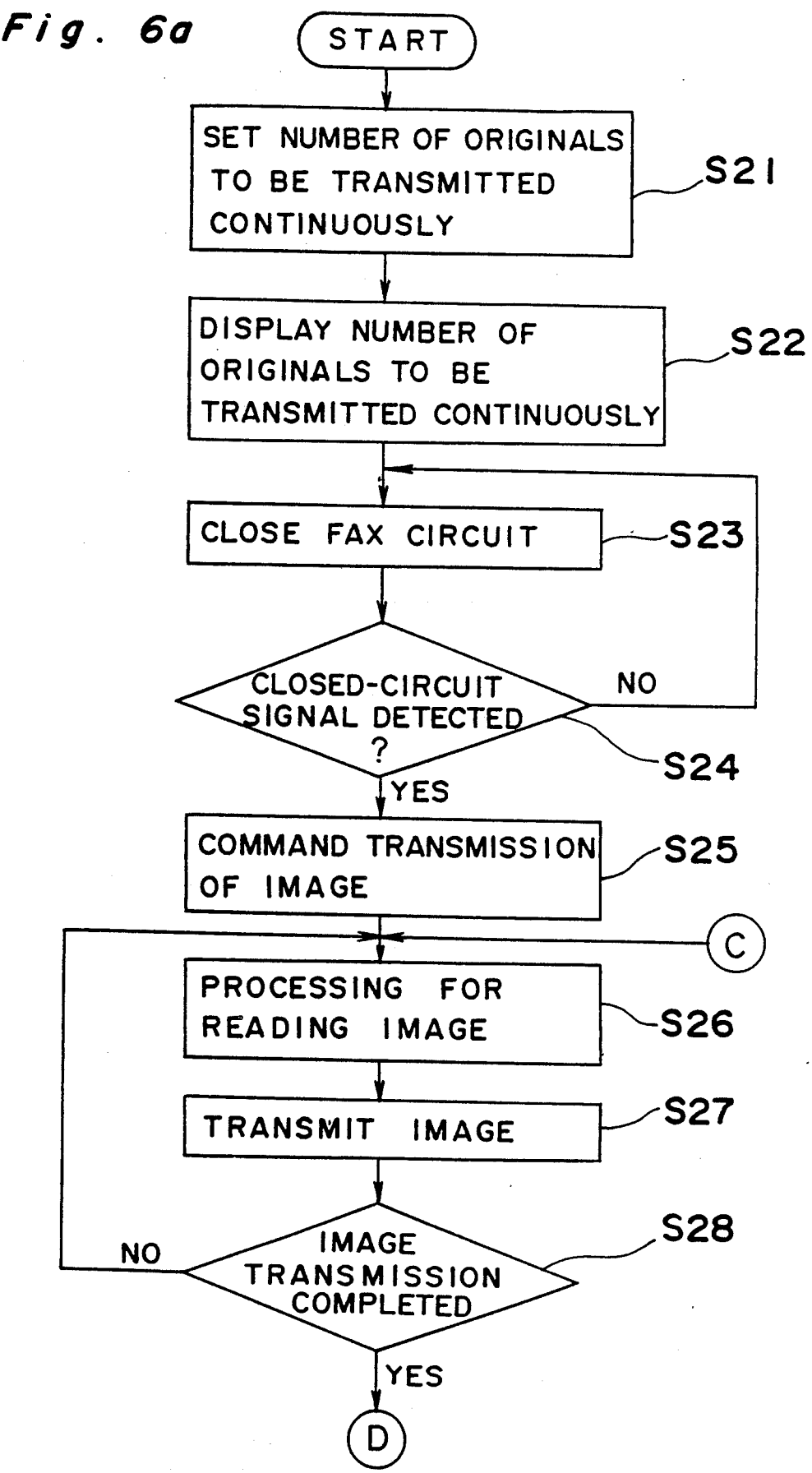
Figure 6B:
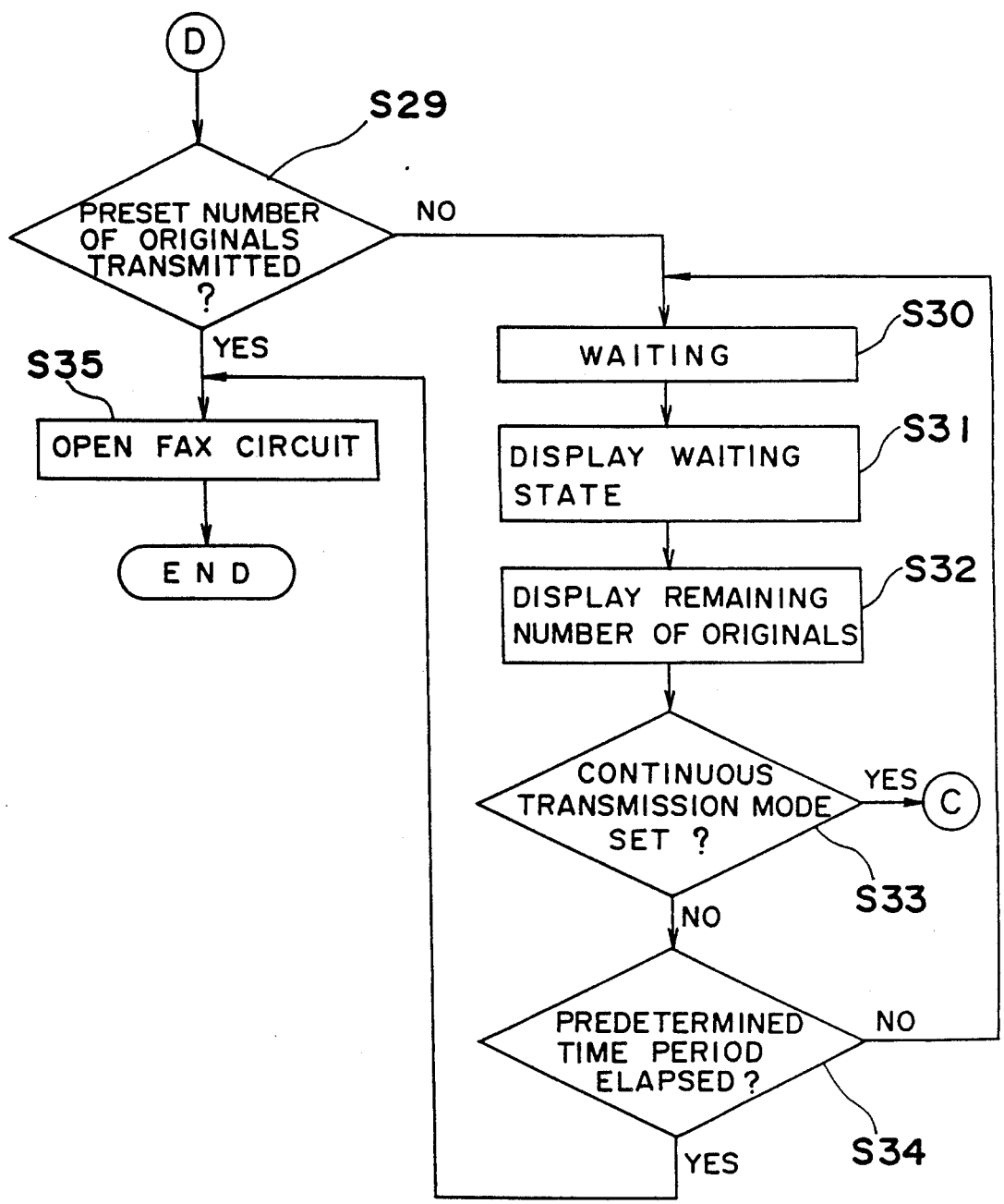

As described above, it becomes possible to transmit images of a plurality of original documents in the facsimile machine S of image reader scanning type. However, a continuous transmission method of the present invention is not limited to the one referred to above but can be modified as shown in flow charts of FIGS. 6a and 6b. In the continuous transmission method of FIGS. 6a and 6b, the number of original documents to be continuously transmitted is preliminarily inputted before facsimile transmission of the original documents is started. Namely, in order to start facsimile transmission, the operator initially operates the setting key F3 for setting the facsimile machine S to the continuous transmission mode and then, inputs, by using the ten keys F5 at step S21, the number of original documents to be continuously transmitted, e.g. 5. The inputted state of the continuous transmission mode being set and information on the number of original documents are stored in the storage 31. Furthermore, at step S22, the information on the number of original documents to be continuously transmitted is displayed by the display portion F1 as shown in FIG. 3 and the state of the continuous transmission mode being set is displayed by the indicating lamp F4. Thereafter, at step S23, the operator dials the transmitting side telephone set 8 so as to call the telephone set of the receiving side facsimile machine 4. Subsequently, at step S24, the operator waits for the signal permitting closing of the facsimile circuit, which signal is outputted from the receiving side facsimile machine 4. If it is found at step S24 that the facsimile machine S has been set to the continuous transmission mode upon detection of the signal permitting closing of the facsimile circuit, the operator operates the start key F2 of the input device F so as to command the system control circuit 11 to start reading and transmission of the image of one original document at step S25. Thus, the system control circuit 11 actuates the image reader 12, the data storage 13 and the encoding circuit 14 so as to transmit the image of one original document to the receiving side facsimile machine 4 through the modem 15 at steps S26 and S27. Thus, when transmission of one document has been completed at step S28, the system control circuit 11 makes a decision at step S29 as to whether or not transmission of the preset number of original documents has been completed in the continuous transmission mode. In the case of "NO" at step S29, the timer 32 is actuated so as to set the facsimile machine S to the waiting state at step S30 and the indicating lamp F4 is blinked at step S31 so as to display the waiting state. Furthermore, at step S32, the number of the remaining original documents, 4, which is obtained by subtracting one from the preset number of the original documents to be continuously transmitted, 5, is displayed by the display portion F1 of the input device F at step S32 as shown in FIG. 3. Subsequently, if it is found at step S33 that the first original document has been exchanged with the second original document and the setting key F3 has been operated while the timer 32 is counting 15 seconds, the program flow returns to step S26 such that the system control circuit 11 commands the respective operating blocks to start reading and transmission of the image of the second original document. When reading and transmission of the image of the second original document are started as described above, the blinking indicating lamp F4 is changed over to the ON state so as to display the continuous transmission mode.

On the other hand, if it is found at step S34 that the setting key F3 is not operated during 15 seconds, the system control circuit 11 commands the NCU 7 to open the facsimile circuit at step S35. Meanwhile, in the case where transmission of the preset number of the original documents has been completed at step S29, the program flow proceeds also to step S35 so as to open the facsimile circuit.

As is clear from the foregoing description, in the facsimile machine of the present invention, the facsimile circuit can be kept closed until the predetermined time period elapses after the image of one original document has been transmitted during continuous transmission of a plurality of original documents. Accordingly, in accordance with the present invention, it becomes possible to continuously transmit the original documents without encountering such a problem that the facsimile circuit is opened during exchange of the original documents.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A facsimile machine for reading image information to be transmitted from a plurality of original documents, said documents being sequentially positioned at a reading portion of said facsimile machine, said facsimile machine further recording received image information, said facsimile machine comprising:

setting means for setting said facsimile machine to a continuous transmission mode for continuously transmitting the plurality of sequentially positioned original documents;

storage means for storing, in response to an input from said setting means, a state in which said facsimile machine is set to the continuous transmission mode;

input means for inputting the number of original documents to be transmitted, said input means being selectively operated;

document counting means for counting the original documents transmitted by the facsimile machine and for determining whether the number of documents transmitted equals the input number of original documents to be transmitted if said input means has been operated; and time counting means for counting, when the state is stored in said storage means, a time period for keeping a facsimile circuit of said facsimile machine closed until the time period counted by said time counting means at least reaches a predetermined value, when said input means is not operated, said time period being counted after transmission of an image of each of the original documents;

whereby a time period is provided to remove a transmitted original document from the reading portion and to place a subsequent original document to be transmitted at said reading portion while said facsimile circuit remains closed; and when said means is operated, said time period being counted after transmission of an image of all but the last of the original documents, whereby said time period is not provided after the last original document.

2. The facsimile machine as claimed in claim 1, further comprising a movable light source type image scanner, said scanner being displaceable for reading the image information.

3. The facsimile machine as recited in claim 1, wherein said original documents comprise book-like documents and wherein access space is provided adjacent said reading portion to accommodate placement and removal of said book-like documents at said reading portion.

4. A facsimile machine for reading image information to be transmitted from a plurality of original documents, said documents being sequentially positioned at a reading portion of said facsimile machine, said facsimile machine further recording received image information, said facsimile machine comprising:

setting means for setting said facsimile machine to a continuous transmission mode for continuously transmitting the plurality of sequentially positioned original documents, said continuous transmission mode being defined as a single establishment and maintenance of a closed facsimile transmission circuit, said setting means being selectively operable by the machine operator;

storage means for storing, in response to an input from said setting means, a state in which said facsimile machine is set to the continuous transmission mode;

input means for inputting the number of original documents to be transmitted, said input means being selectively operated;

document counting means for counting the original documents transmitted by the facsimile machine and for determining whether the number of documents transmitted equals the input number of original documents to be transmitted if said input means has been operated; and time counting means for counting, when the state is stored in said storage means, a time period for keeping a facsimile circuit of said facsimile machine closed until the time period counted by said time counting means at least reaches a predetermined value, when said input means is not operated, said setting means being operable to initially establish said continuous transmission mode after initiation of the reading and transmission of the first original document and upon transmission of each of the original documents, except the last document, to maintain said continuous transmission mode, said time period being counted after transmission of an image of each of the original documents, whereby a time period is provided to remove a transmitted original document from the reading portion and to place a subsequent original document to be transmitted at said reading portion while said facsimile circuit remains closed; and when said input means is operated, said setting means being operatable prior to inputting the number of original documents to be transmitted to establish said continuous transmission mode and thereafter upon transmission of each of the original documents, except the last document, to maintain said continuous transmission mode, said time period being counted after transmission of an image of all but the last of the original document, whereby said time period is not provided after the last original document.

5. The facsimile machine as claimed in claim 4 further comprising a movable light source type image scanner, said scanner being displaceable for reading to the image information.

6. The facsimile machine as recited in claim 4, wherein said original documents comprise book-like documents and wherein access space is provided adjacent said reading portion to accommodate placement and removal of said book-like documents at said reading portion.

* * * * *